Sept. 30, 1924.
S. ADVENT
1,509,991
LIFE SAVING FENDER FOR VEHICLES
Filed May 10, 1924    3 Sheets-Sheet 1
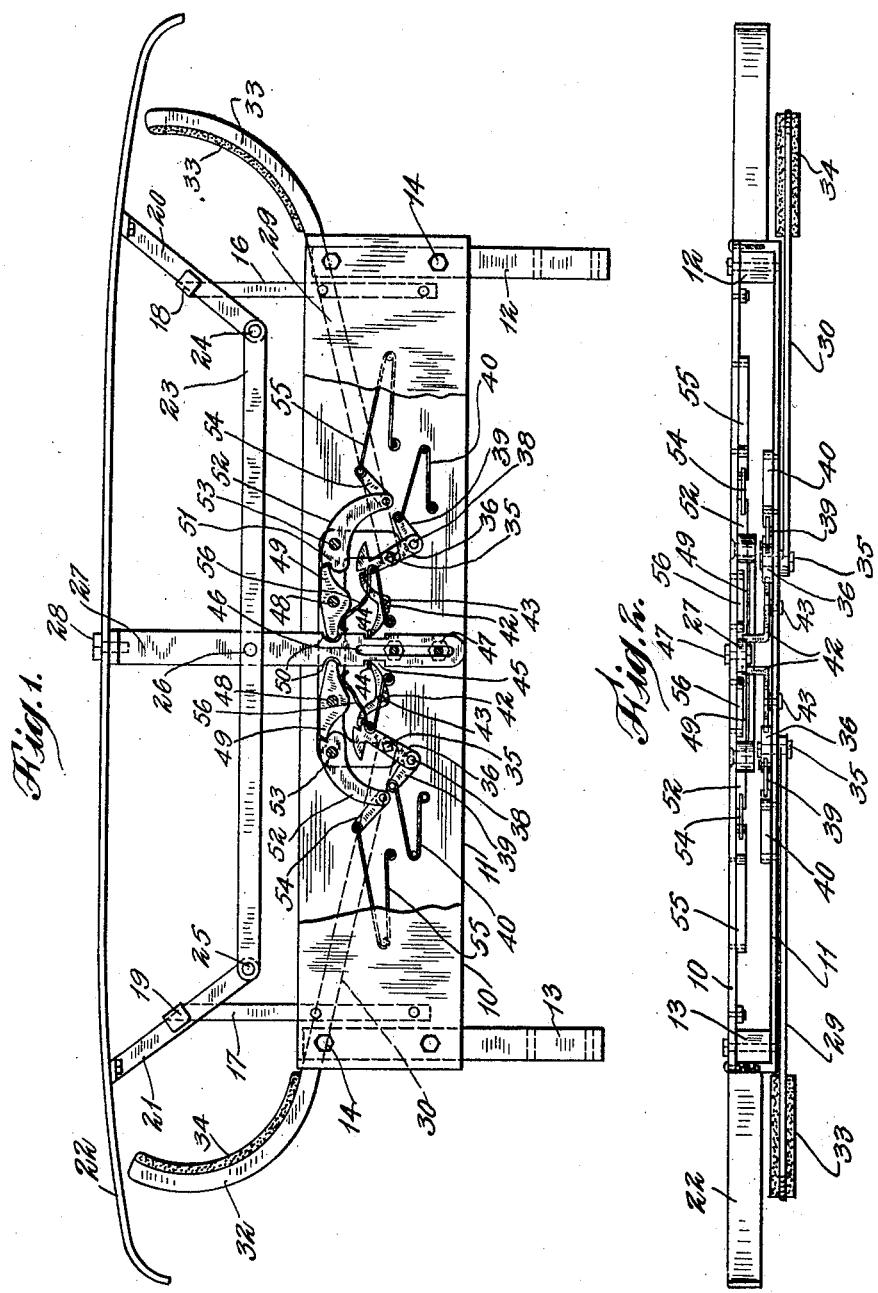
INVENTOR.
Stanley Advent

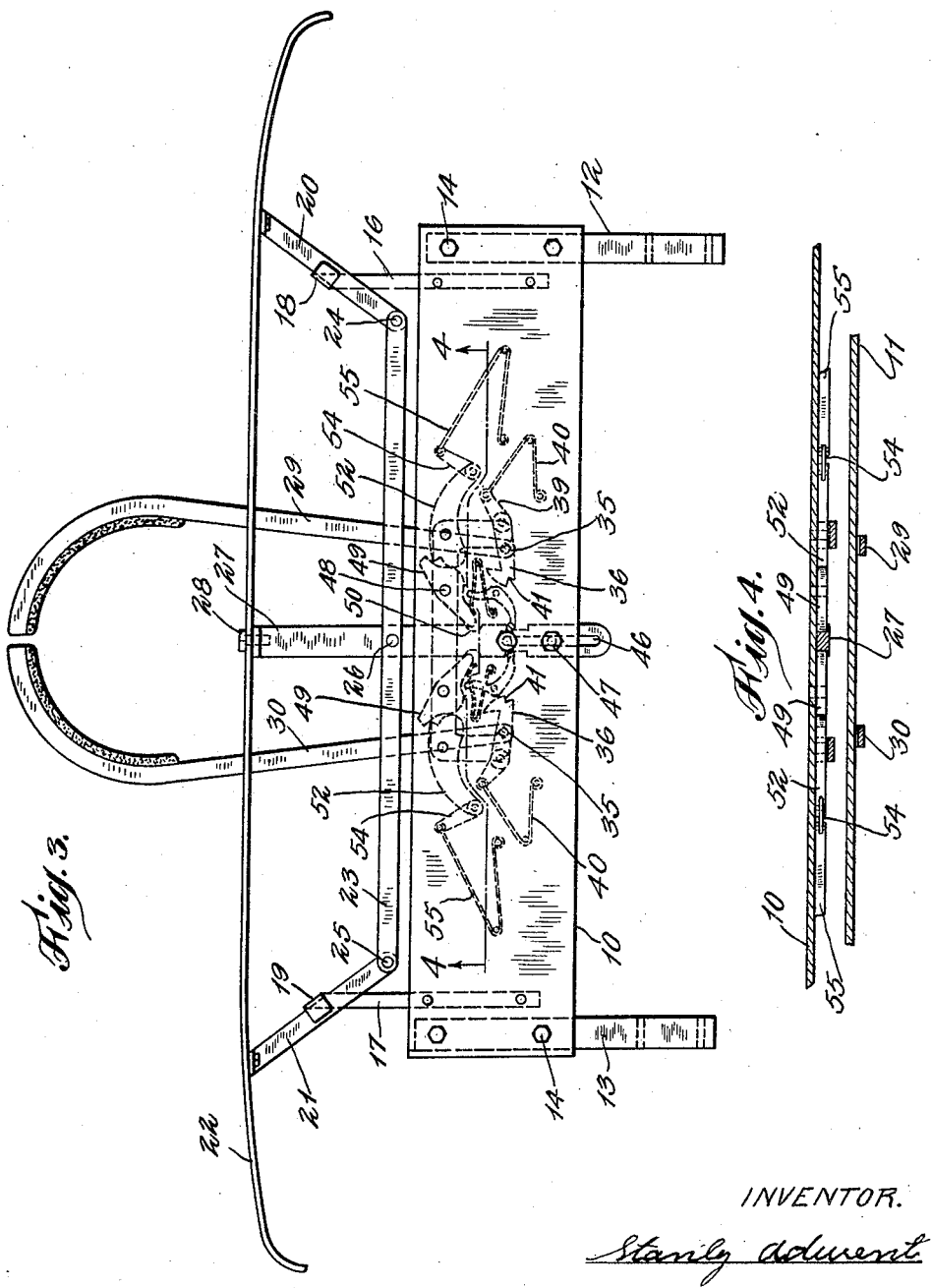

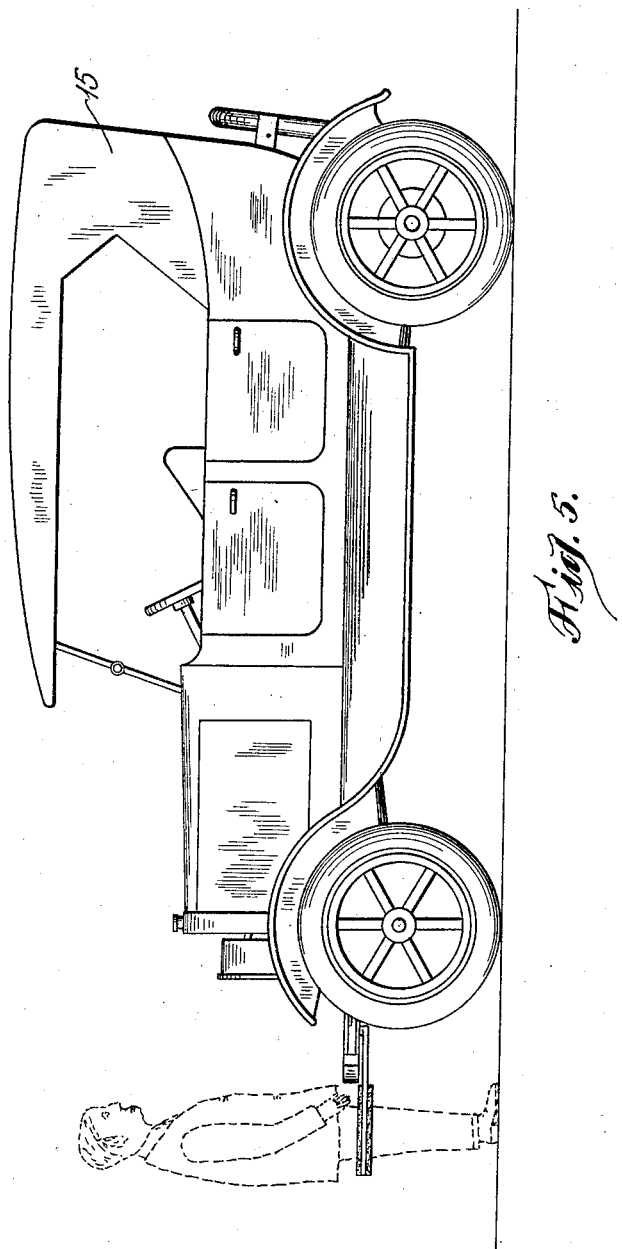

Patented Sept. 30, 1924.

1,509,991

UNITED STATES PATENT OFFICE.

STANLY ADVENT, OF DETROIT, MICHIGAN.

LIFE-SAVING FENDER FOR VEHICLES.

Application filed May 10, 1924. Serial No. 712,307.

*To all whom it may concern:*

Be it known that I, STANLY ADVENT, a citizen of Poland, and resident of Detroit, in the county of Wayne and State of Michigan, have invented certain new and useful Improvements in Life-Saving Fenders for Vehicles, of which the following is a specification.

This invention relates to improvements in fenders, particularly devised for use with motor cars, street cars, railway carriages, etc., and it is the principal object of the invention to provide a fender which will be operated automatically upon its engagement with an obstruction in the road, for instance a person, and will lift and hold said person from the road thus ensuring safety of life and limb.

Another object of the invention is the provision of a fender of this type which is equipped with means properly cushioned to prevent injury to the person picked up by the fender.

A further object of the invention is the provision of a fender which will positively operate at all times and which can be conveniently reset after each operation.

A still further object of the invention is the provision of a fender of durable construction which can be readily attached to any type of car now in common use.

These and other objects of my invention will become more fully understood as the description thereof proceeds, and will then be specifically pointed out in the appended claims.

In the accompanying drawing, forming a material part of this disclosure:

Figure 1 is a top plan view of a fender constructed according to the present invention, illustrating the same with its arms open ready for operation, part of the top plate being broken away to disclose the interior construction.

Figure 2 is a front end view of my improved fender.

Figure 3 is a top plan view of the fender illustrating the same in working position with closed arms.

Figure 4 is a partial longitudinal section on line 4—4 of Figure 3.

Figure 5 shows in side elevation a car equipped with my improved fender in the act of catching and lifting a person.

The fender comprises a top plate 10 and a bottom plate 11 held together by arms 12 and 13 secured with their outer ends between both of said plates and secured in position by means of nut bolts 14 passing through the top plate, the arms and the bottom plate.

The inner ends of said arms are secured in any well known manner to suitable elements at the front part of a car 15, as illustrated in Figure 5 by way of example.

Between the plates 10 and 11 are also secured the inner ends of bars 16 and 17 provided with bent fingers 18 and 19 at their outer ends which grip over and loosely engage the side links 20 and 21 attached at their front parts or ends to the fender bar 22, while their rear ends are connected by a bar 23 to which they are pivoted as at 24 and 25.

Intermediate its ends, in approximately its center, the bar 23 is secured, as at 26, to an arm 27 clamped at its outer end, as at 28, to the fender bar 22, while its inner end slides in and out of the space between the top and bottom plates 10 and 11.

Catcher arms 29 and 30 are movable with their inner ends between the plates 10 and 11, while their outer curved ends are formed into jaws 31 and 32, equipped at their inner faces with a cushioning material 33 and 34, or a piece of rubber hose may be slipped over these arms to protect their ends and to softening their engagement with a person.

The inner ends of the arms 29 and 30 are connected by means of square pins 35 to pawls 36 forming one arm of bell-crank levers pivoted at 38 to the bottom plate 11, the other arms of which, 39, are engaged by springs 40 adapted to press arms 39 towards the front when the pawls 36 are released, as will be more fully described herebelow.

The inner front faces of the pawls 36 are provided with shoulders 41 adapted to be engaged by the ends of bell-crank levers 42 pivoted at 43 to the bottom plate 11, the other ends or arms of which engage under shoulders 44 in the side edges of arm 27 formed by the recesses 45 in said side edges. This arm 27 has also a longitudinal slot 46 in its body in which nut bolts 47 travel in order to guide the bar 27 during its inward or outward movements between plates 10 and 11.

To the inner face of top plate 10 are also pivotally secured, as at 48, pawls 49 engaging with their inner ends in curved recesses or grooves 50 in arm 27, while their outer ends engage shoulders 51 formed in the ends of pawls 52 pivoted near their inner ends as at 53 to the upper or top plate 10. The pawls 52 constitute one arm of bell-crank levers, the other arms 54 of which stand under the action of springs 55 attached to the top plate and shaped as illustrated in the drawings to operate as hereinafter more fully to be described.

Springs 56 of a form best illustrated in Figure 1, are attached to the top plate and operate as will be hereafter more fully described.

The device operates as follows:

Assuming the parts are in their position of rest, illustrated in Figure 1, ready for action. If now the fender bar 22 strikes an object or person in the path of the vehicle, it will be pressed inwardly, and the arm 27 will slide inwardly between the plates 10 and 11.

The engagement of pawls 49 in the grooves 50 of arm 27 will turn the pawls around their pivot points 48 against the action of springs 56 which will be compressed. The engagement of the inner ends of the bell-crank levers 42 with the shoulders 44 of the arm 27 will swing the levers 42 during the inward motion of arm 27 around their pivots 43 and disengage their outer ends from the shoulders 41 of the bell-crank levers 36, which will turn around their pivots and on account of their connection by the square pins 35 with arms 29 and 30 will allow said arms to move into closing position in which their jaws will engage a person struck by the fender bar 22. The arms are held in this position by the action of the strong springs 40 which press the outer arms 39 of the bell-crank levers upward to hold arms 36 as far downward as possible.

The pawls 49 at the same time will, during the inward motion of arm 27 between the plates 10 and 11, disengage from the shoulders of the inner arms of bell-crank levers 52, the other arms of which, 54, will be moved upwardly by the springs 55 to hold arms 52 downward against the lower edge of pawls 49 for locking the same in their disengaged position. This locking will be assisted by springs 56 pressing against the under face of the pawls on the opposite side of their pivot points.

The nut bolts 47 will travel within the longitudinal slot 46 in arm 27 and guide the movements of the arm.

The closed jaws of the catcher arms 29 and 30 will grip a person struck by the fender bar 22 around the body and as they are provided with cushions will not injure the person while keeping him out of the path of the car and from being run down, preventing the person from being caught under the wheels.

In order to free the person and to reset the mechanism, the jaws of arms 29 and 30 are opened, and the fender bar 22 is pulled outwardly, so that the parts will again assume the catching position illustrated in Figure 1. By these operations the inner arms of bell-crank levers 36 will be swung upwardly against the action of springs 40 until their shoulders are again engaged by the ends of pawls 42 and kept in this position by the assistance of springs 40, while the other ends of the pawls rest against the shoulders 44 of arm 27 which during its outward movement will swing the pawls 42 into the proper position to effect the above described engagement. The outward movement of arm 27 will also swing pawls 49 around their pivot points 48 owing to the engagement of their inner ends in the grooves 50 of arm 27, so that the outer ends of pawls 49 will again engage the shoulders of the bell-crank lever arms 52 and the parts will be kept in this engaged position by the action of springs 55 assisted by springs 56, as will easily be understood by an inspection of the drawing.

The loose engagement between the fingers 18 and 19 of links 16 and 17 with the arms 20 and 21 will limit the outward movement of the frame and guide the same.

It will be clear that changes may be made in the general construction and in the arrangement of the minor details of my invention without departure from the spirit and scope thereof as defined in the appended claims.

Having thus described my invention, what I claim as new, and desire to protect by Letters Patent is:

1. Vehicle fender of the class described comprising a fender bar, a frame carrying said fender bar and adapted to be attached to a vehicle, a pair of plates on said frame, an arm connected to said fender bar slidingly guided between said plates, and means between said plates to open and close a pair of jaws during the movements of said arm between said plates, said means adapted to be locked in the open and closed positions of said jaws.

2. Vehicle fender of the class described comprising a fender bar, a frame to which said bar is attached adapted to be secured to the vehicle, a pair of movable catcher jaws, arms carrying said jaws, inner cushions for said jaws, a pair of superposed spaced plates on said frame between which said arms move, and means for closing said arms when said fender bar strikes an object in the path of the vehicle and permitting a release of the caught object and a resetting of the jaws.

3. Vehicle fender of the class described comprising a fender bar, a frame carrying said fender bar and adapted to be attached to the front end of the vehicle, a pair of plates on said frame, a pair of jaw carrying arms movable between said plates, an arm connected to said fender bar and movably guided between said plates, and means between said plates for locking said jaw carrying arms normally in the open position of the jaws and allowing a throwing of said arms into operating position of the jaws upon the engagement of said fender bar with a person in the path of the vehicle.

4. Vehicle fender of the class described comprising a frame, a pair of spaced superposed plates held on said frame, means for attaching said frame to a car, a fender bar adapted to be moved towards and away from said plates, an arm secured at one end to said bar and movably guided with its other end between said plates, means for limiting the movements of said arm, a system of pawls and a system of bell crank levers adapted to be engaged by said pawls between said plates, and springs for controlling and locking said bell crank levers in their adjusted positions.

5. Vehicle fender of the class described comprising a frame adapted to be attached to the front part of the vehicle including two superposed spaced plates carried thereby, a fender bar, an arm connected at one end to said fender bar and slidingly guided with its other end in the space between said plates, a bar parallel to said fender bar carried by said arm, links connecting said bar with said fender bar, means for guiding and limiting the relative movements of the parts, a pair of jaw carrying arms between said plates, and means between said plates and engaged by said arm connected with the fender bar for operating said jaw carrying arms to open and close, and allowing a locking of the same in their open and closed positions.

6. In a vehicle fender of the class described the combination of a pair of movable catcher arms with a fender bar, and means for causing said arms to close around a person upon the operation of said fender bar by said person, said means comprising a system of pawls and bell-crank levers, springs for controlling and locking said bell-crank levers and assisting in locking said pawl and bell-crank lever systems in their adjusted positions for opening and closing said catcher arms.

7. In a vehicle fender of the character described a pair of catcher arms, spaced plates between which said catcher arms are guided at their inner ends, bell-crank levers between said plates, square bolts for attaching and guiding the lower ends of said catcher arms with said levers, and springs for holding the catcher arms in the closed position of the jaws.

8. In a vehicle fender of the class described, a pair of spaced superposed plates, a fender bar, an arm secured to said fender bar at one end and having a longitudinal slot in its opposite end guided between said plates, said arm having grooves and recesses in its side edges to form shoulders, pawls permanently in engagement with one of their ends in said grooves and recesses, bell crank levers engaging the other ends of said pawls, a pair of catcher arms guided between said plates adapted to be normally locked in their inoperative position by the engagement between said bell crank levers and pawls, and flat angular springs for locking the parts in their engaged positions and allowing a movement of said parts into the operative position for closing said jaws.

Signed at Detroit, in the county of Wayne and State of Michigan, this 16 day of April A. D. 1924.

STANLY ADVENT.